United States Patent [19]

Erkfritz

[11] Patent Number: 4,529,338

[45] Date of Patent: Jul. 16, 1985

[54] INSERT ARRANGEMENT FOR A MILLING TOOL

[75] Inventor: Donald S. Erkfritz, Clarkston, Mich.

[73] Assignee: General Electric Company, Detroit, Mich.

[21] Appl. No.: 472,705

[22] Filed: Mar. 7, 1983

[51] Int. Cl.³ .............................................. B26D 1/12

[52] U.S. Cl. ....................................... 407/35; 407/38; 407/41; 407/43; 407/58; 407/61

[58] Field of Search ....................... 407/35, 43, 70, 41, 407/49, 50, 56, 58, 59, 61, 36, 37, 38, 39

[56] References Cited

U.S. PATENT DOCUMENTS

| | | | |
|---|---|---|---|
| Re. 20,722 | 5/1938 | Schmidt | 407/35 |
| 87,985 | 3/1869 | Stephens | 407/43 |
| 1,278,629 | 9/1918 | Francis | 407/43 |
| 1,650,290 | 11/1927 | Metzger | 407/35 |
| 2,081,639 | 5/1937 | Perry et al. | 407/34 |
| 2,317,262 | 4/1943 | Dusevoir | 407/37 |
| 3,106,011 | 10/1963 | Clifton et al. | 407/35 |
| 3,546,761 | 12/1970 | Gage | 407/35 |
| 3,760,476 | 9/1973 | Kotthaus | 407/35 |

FOREIGN PATENT DOCUMENTS

| | | | |
|---|---|---|---|
| 0588073 | 1/1978 | U.S.S.R. | 407/34 |

*Primary Examiner*—Francis S. Husar
*Assistant Examiner*—William E. Terrell
*Attorney, Agent, or Firm*—A. E. Bahr; E. F. Chapman; J. J. Lichiello

[57] ABSTRACT

Metal working tools or tool holders having a body with flat-faced surface containing insert pockets with at least two indexable inserts in each pocket are described. A tapered wedge block is positioned between each pair of inserts to wedge the inserts against the walls of the insert pocket and to separate the pair of inserts from each other. The pair of inserts have parallel cutting edges facing the leading wall. In one preferred embodiment, a pair of indexable cutter inserts are positioned in each pocket of a plural pocket face mill body. The inserts are positioned in leading and trailing positions with an intermediate wedge block to provide parallel cutting surfaces in the same direction.

3 Claims, 2 Drawing Figures

INSERT ARRANGEMENT FOR A MILLING TOOL

BACKGROUND OF THE INVENTION

A milling cutter may take the form of a flat faced disc or body member which has a coaxial drive means on one side, and the other side, face, includes a number of indexable insert cutters and corresponding grooves, pockets or slots. The cutter inserts are arranged so that when the face of the tool is brought up against a workpiece, for example a flat surface of a workpiece, the inserts cut out or remove an annular groove, a saucer depression and the like large area cuts. The area of the face or the periphery area of the disc which is adapted to contain the cutter insert is the limiting factor to the number of inserts that can gainfully be employed commensurate with the design and strength of the disc member. Obviously, existing disc members simply limit the number of insert cutters by their original design, since ordinarily there are no adjustment features. In the usual design, a milling cutter face includes a plurality of generally rectangular sockets or pockets therein. A single generally rectangular cutter insert is positioned in each pocket and a wedge block is used in the pocket to firmly wedge the insert in position. A further hindrance to the desired use of a greater number of inserts is the increased tool chatter which occurs when a plurality of inserts engage the workpiece with the same frequency and amplitude. An increase in the number of cutter inserts, commensurate with diminished chatter would represent a more desirable milling kind of tool.

SUMMARY OF THE INVENTION

It has now been discovered that the number of inserts in a disc cutter may nearly be doubled by a more effective use of wedges and inserts in slightly modified pockets.

In a given plunge milling cutter having one or more circular rows of pockets to contain insert and wedges, the pockets are made slightly wider, if necessary, and in each pocket there is positioned a pair of inserts with an intermediate wedge. The insert positioning geometry is modified to minimize chatter.

BRIEF DESCRIPTION OF THE DRAWINGS

This invention will be better understood when taken in connection with the following description and the drawings in which.

DESCRIPTION OF PREFERRED EMBODIMENT

Figure 1:
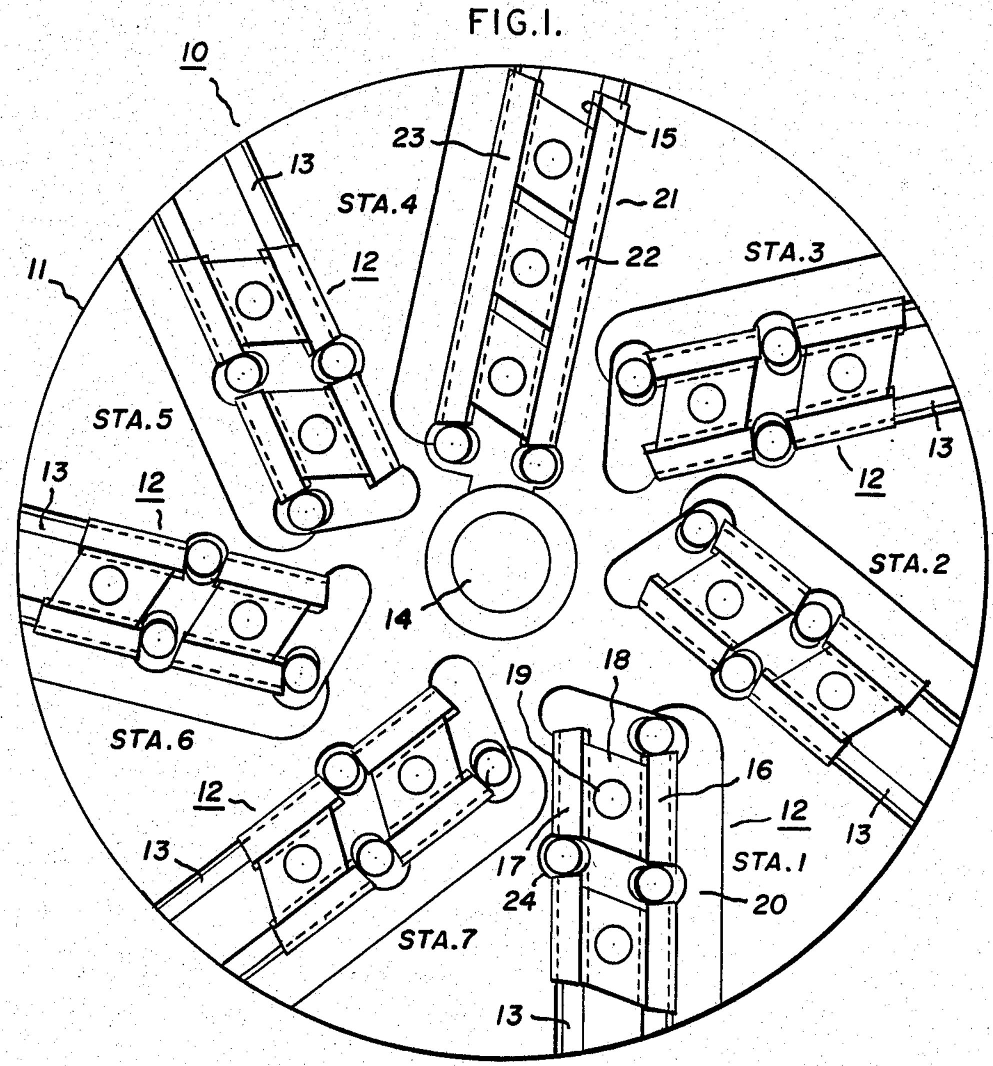
FIG. 1 is a plan view of one embodiment of this invention as a plunge mill cutter.

Referring now to FIG. 1 there is illustrated a plunge mill cutter 10 comprising a heavy wheel or disc member 11 and a plurality of repeating sets of inserts 12 arranged on the working face thereof. The reverse face of the cutter 10 contains the usual drive means for rotating the disc member 11 about its concentric axis.

Disc member 11 includes a series of generally rectangular slots 13 which progress from the periphery of the disc towards the center 14 but purposefully not radially. The center line of each groove with the exception of groove 15 is displaced from or offset from a center line of the circle in the direction of rotation a suitable amount to provide a proper negative radial rake. Also, some of the peripheral angular distances between groove centerlines at the outer periphery of the disc member are equal and some are unequal. The slots 13 have been slightly enlarged in width, for example about 25%, to accommodate the insert combination as illustrated.

Each repeating insert set 12 comprises two inserts 16 and 17, which may be the usual cobalt cemented tungsten carbide inserts, in a generally rectangular or diamond shape. These inserts 16 and 17 are positioned one against the leading wall of the groove (in the direction of rotation of the disc, counterclockwise in the case of FIG. 1) and the other one against the trailing wall of the groove. Each insert has its exposed cutting edge parallel to the cutting edge of the other insert and facing in the same direction. A typical wedge block 18 is wedged between the inserts 16 and 17 and retained within the groove by such means as a machine screw 19 passing through the wedge block 18 and into the disc member 11. Various combinations of tapering groove walls and tapered wedge block surfaces are known to be employed for insert retention purposes. An important point is that formerly only a single insert would be used for each groove. In this particular tool not only are two such inserts employed in front and back relationship as a set of inserts, but also multiple sets or pairs of sets are employed radially in the groove. The unique relationship of these set inserts which permits their effective cutting action in sets, is more clearly shown in FIG. 2.

Figure 2:
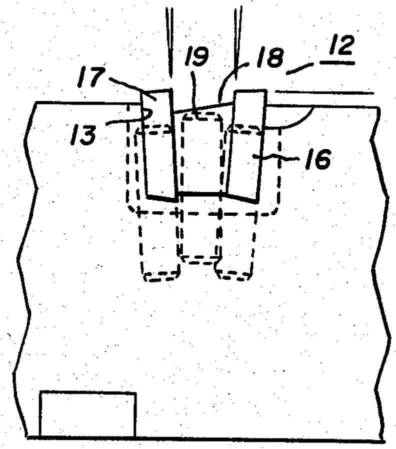
FIG. 2 is a partial and side elevational view of a double insert arrangement as used in FIG. 1.

Referring now to FIG. 2, the elevational view of an insert set 12 shows a leading insert 16 and a trailing insert 17 residing within a groove 13. Wedge block 18, with appropriate tapering front and back surfaces, and screw means 19, is positioned between the inserts 16 and 17 to retain them in the groove in the usual manner.

Referring again to FIG. 1, in order to more effectively utilize the closely spaced inserts in each set 12, they are arranged in pairs, as illustrated in FIG. 1, as a pair of sets 20. In one instance, the insert set 21 comprises a pair of inserts 22 and 23, the inserts being 3 times the length of a typical insert 16 or having a cutting path equal in width to the total cutting path of the tool.

Each insert 16 and 17 in each set 12 is laterally (generally radially) offset with respect to each other to provide some overlap in the cutting path. The overlap is predetermined among all insert sets 12 so that a clean cut is obtained and cutting forces are more equalized amongst the inserts. Also, the insert set 12 in each pair of sets 12 is laterally separated from an adjacent set 12 by means of spacer members 21. Spacer members 24 may be dowel like pins adjacent an insert 16 and 17 in each adjacent pair of sets 12 and fixes the overlap position of all insert sets.

Disc chatter is dampened in this invention by a combination of features. For example, the sets 12 of inserts in a given groove are mounted at uneven heights above the face of the disc member 12. For example, referring to FIG. 1 the pair 20 of insert sets 12 closest to the 6 o'clock position of the disc 11 are referred to as station 1, STA. 1 reading counterclockwise to STA 7. The insert sets for STA. 1 and 7 project above the face of disc member 11 a given distance while STA. 2 and 6 project further, and STA. 3 and 5 project still further. STA. 4 projects the furthest and is effectively utilized to wipe out any overlap marks.

A geometry change for leading and trailing inserts 16 and 17 using the same wedge has been employed for further vibration damping purposes. This is more clearly shown in FIG. 2. In FIG. 2 the leading insert 16 has its axial centerline at a positive rake position while the trailing insert 17 has its axial centerline at a negative rake. When viewed from the disc center of FIG. 1, the radial rake is more negative for the leading insert.

The forward rate of advance of the milling cutting tool is usually constant but the improved geometrics of this invention lead to more effective metal removal and provide a non-rhythmic, chatter minimizing, tool.

This invention can be applied to various metal working tools where but one pocket is employed in a given tool holder. The invention, however, is more applicable to rotary tools having a plurality of pockets therein, and principally to a milling tool.

Although the present invention has been described with reference to the foregoing specification, many modifications, combinations and variations of the invention will be apparent to those skilled in the art in light of the above teachings. It is therefore understood that changes may be made to the particular embodiments of the invention which are within the full scope of the invention as defined by the following claims.

I claim:

1. A rotary tool member comprising:

(a) a body member having a flat-faced surface adapted to face a surface of a workpiece for metal removal;

(b) said flat-faced surface of said body member having a plurality of grooves therein defining a leading and trailing wall and wherein the grooves are arranged to extend inwardly from the periphery of the rotary member;

(c) a plurality of sets of indexable inserts in said groove and extending inwardly from the periphery of the rotary member, the inserts of which have a parallel cutting edge facing the leading wall;

(d) one of said inserts being positioned adjacent said leading wall and the other of said inserts being spaced therefrom and positioned adjacent the trailing wall of said groove, the inserts of each set being arranged to have a positive and negative axial rake respectively in the direction of rotation of the rotary member;

(e) a tapered wedge block member positioned in said groove and between said inserts; and (f) means adjustably retaining said wedge block in said groove to tightly wedge said inserts in their defined position.

2. A plunge mill cutter comprising in combination:

(a) a disc member having a flat face thereon;

(b) a plurality of peripherally inwardly directed insert grooves in said face, each groove having a centerline, the centerlines of none of which are coincident with a radial line of the disc;

(c) a plurality of sets of inserts positioned side by side axially in some of said grooves, each set comprising a leading and trailing insert in said grooves with a wedge block therebetween to tightly retain said inserts against respective walls of said grooves;

(d) the inserts in each set being laterally offset or overlapping with respect to each other and having parallel cutting edges;

(e) a spacing member between adjacent sets of inserts; and (f) one set of inserts in one of said grooves having a total cutting width equal in length to the total cutting path of the milling cutter and each set of inserts of the remainder of the plurality of sets of inserts having a total cutting width less than the length of the total cutting path of the milling cutter.

3. The invention as recited in claim 2 wherein each set of inserts has the leading insert at a positive axial rake and the trailing insert at a negative axial rake.

* * * * *